United States Patent
Wessels et al.

(10) Patent No.: US 6,903,153 B2
(45) Date of Patent: Jun. 7, 2005

(54) LASER-WRITABLE POLYMER COMPOSITION

(75) Inventors: Esther Wessels, Emmen (NL); Johannes F. Higler, Elsloo (NL)

(73) Assignee: DSM IP Assets B.V., Heerlen (NL)

( * ) Notice: Subject to any disclaimer, the term of this patent is extended or adjusted under 35 U.S.C. 154(b) by 137 days.

(21) Appl. No.: 10/025,684

(22) Filed: Dec. 26, 2001

(65) Prior Publication Data

US 2002/0077380 A1 Jun. 20, 2002

Related U.S. Application Data

(63) Continuation of application No. PCT/NL00/00449, filed on Jun. 28, 2000.

(30) Foreign Application Priority Data

Jun. 30, 1999 (NL) ............................................ 1012476

(51) Int. Cl.$^7$ ................................................ C08K 3/10
(52) U.S. Cl. ....................... 524/409; 524/101; 524/102; 524/103; 522/81; 522/83
(58) Field of Search ................................ 524/409, 101, 524/102, 103; 522/2, 81, 83; 204/192

(56) References Cited

U.S. PATENT DOCUMENTS

| 3,898,194 | A | | 8/1975 | Sanroma | |
|---|---|---|---|---|---|
| 6,043,304 | A | * | 3/2000 | Kehal | 524/115 |
| 6,184,282 | B1 | * | 2/2001 | Gareiss et al. | 524/493 |
| 6,280,520 | B1 | * | 8/2001 | Andes et al. | 106/415 |

FOREIGN PATENT DOCUMENTS

| DE | 4143258 | 7/1993 |
|---|---|---|
| EP | 0472935 | 3/1992 |
| EP | 0567977 | 11/1993 |
| JP | 8041291 | 2/1996 |

* cited by examiner

*Primary Examiner*—James J. Seidleck
*Assistant Examiner*—U. K. Rajguru
(74) *Attorney, Agent, or Firm*—Mayer Brown Rowe & Maw LLP

(57) ABSTRACT

The invention relates to a polymer composition containing a polymer and, as an additive for making a dark laser marking, at least 0.1 wt. % antimony trioxide having an average particle size above 0.5 micrometer. The invention also relates to articles wholly or partly made of the polymer composition and to a process for applying a dark laser mark onto a light background of such article. The polymer composition according to the invention can be marked with laser light of wavelength 1064 nm.

18 Claims, No Drawings

LASER-WRITABLE POLYMER COMPOSITION

CROSS-REFERENCE TO RELATED APPLICATIONS

This is a Continuation of International Application No. PCT/NL00/00449 filed Jun. 28, 2000, which designated the U.S. and was published in the English language. The contents of this PCT application are incorporated in their entirety by reference.

The invention relates to a polymer composition containing a polymer and, as an additive for making a dark laser marking on a light background, at least 0.1 w% (wt. % relative to the total weight of the polymer composition) antimony trioxide. The invention also relates to articles wholly or partly made of the polymer composition and to a process for applying a dark laser mark onto a light background of such article.

The German patent specification DE-A-4143258 discloses a polymer composition that contains polyacetal and an inorganic, photoactive white pigment. The German patent specification defines an inorganic, photoactive white pigment as a substance whose color changes from light to dark by the action of UV light. As photoactive white pigments the German patent specification mentions titanium dioxide, antimony trioxide and zinc oxide. According to the German patent specification DE-A-4143258 markings on molded articles made of the known polymer composition are produced using an Excimer laser with a wavelength of between 200 and 550 nm.

A drawback of the known polymer composition is that only for polyacetal it yields markings that are scratch resistant and sufficiently rich in contrast. A further drawback is that the dark-colored markings can be obtained only by means of an Excimer laser with a wavelength of between 200 and 550 nm, while the laser most commonly used for applying markings is an Nd:YAG laser (with a wavelength of 1064 nm). Nd:YAG lasers are preferred over Excimer lasers as they are more stable and have a writing head.

The aim of the invention is to provide a polymer composition that does not have said drawbacks.

This aim is achieved in that in the polymer composition according to the invention the antimony trioxide has an average particle size above 0.5 micrometer.

The polymer composition according to the invention can be marked by means of laser light forming a dark marking with a good contrast with its light background. A major advantage is that the wavelength of the laser light used for marking can freely be chosen and is not limited to laser light from an Excimer laser with a wavelength of between 200 and 550 nm. In particular it is an advantage that the polymer composition can be marked with laser light of wavelength 1064 nm, due to which a readily available cheap Nd:YAG laser can be used. Moreover, the choice of the polymer in the polymer composition is not limited to polyacetal for obtaining scratch resistant markings that are rich in contrast. Experiments have shown that a good contrast is obtained also when a polymer composition according to the invention on the basis of other polymers is subjected to laser writing.

A further major advantage of the polymer composition according to the invention is that it is possible to use a diode-pumped laser rather than a lamp-pumped laser to obtain markings having a reasonable to good contrast. In general, it is necessary to use a lamp-pumped laser for processes in which much heat is required, as in the present case for obtaining a dark marking on a light background. Because of, among other factors, the small pulse length and beam diameter, a diode-pumped laser usually gives poor results. It is therefore very surprising that markings with a reasonable to good contrast can be obtained with the polymer composition according to the invention when using a diode-pumped laser. In view of the growing popularity of diode-pumped lasers it is an important advantage of the polymer composition according to the invention that molded articles consisting, at least at the place where the marking is applied, of this polymer composition can be marked with such lasers.

The contrast can be measured as described hereafter in the experimental section and is expressed in the contrast value. A contrast value of 1 means no contrast i.e. no visible laser marking. Although the effect of the invention is visible at contrast values between 1 and 1.5, the contrast value is for practical purposes preferably at least 1.5, more preferably at least 1.8 and most preferably at least 2. A contrast value of at least 2 is considered good for most purposes. For very demanding purposes, for example key caps, logo's, and fine text requiring high resolution and contrast the contrast value is preferably chosen even higher, preferably at least 2.5 and more preferably at least 3.

In view of obtaining good contrast the average particle size of the antimony trioxide is preferably at least 1, more preferably at least 1.5, even more preferably at least 2 and most preferably at least 3 micrometer. With average particle size is meant the average particle diameter. This can be determined for example with a dynamic light scattering particle analyzer or sieve analysis, e.g. the 325-sieve residue method. Although the contrast can be further improved at higher diameters, the particle size is, in view of the retention of mechanical properties, preferably below 10, more preferably below 8 and most preferably below 5 micrometer. In a preferred embodiment of the composition according to the invention the antimony trioxide has a particle size between 1 and 8 micrometer, more preferably between 2 and 5 micrometer.

The amount of antimony trioxide in the polymer composition according to the invention is preferably at least 0.5 wt. %, more preferably at least 1 wt. %, and even more preferably at least 2 wt. % and most preferably at least 3 wt. %. The advantage of this is an increasing improvement of the contrast. At higher contents up to for example 15% the contrast may further marginally improve. Preferably, however, the amount of antimony trioxide is lower than 10 wt. %, more preferably lower than 8 wt. %, and most preferably lower than 5 or even 4 wt. % as this results in better mechanical properties and electrical properties of the polymer composition, while the contrast obtained upon laser marking is not substantially less. Preferably, the polymer composition therefore contains between 0.1 and 10 wt. %, more preferably between 0.5 and 8 wt. % and most preferably between 1 and 5 wt. % antimony trioxide. In particular when antimony trioxide is the only laser marking additive the amount of antimony trioxide is, in view of obtaining good contrast, preferably between 2 and 5 wt. %. Further, in that case, the average particle size is, preferably also chosen somewhat higher, preferably at least 1.5, more preferably at least 2 and most preferably at least 3 micrometer. The advantage of this embodiment is a very good contrast value, in particular above 2, in combination with a very good retention of the electrical properties, in particular a CTI (comparative tracking index) of at least 60%, preferably at least 70%, more preferably at least 75% (as compared to a comparable sample not having antimony trioxide). For this advantage the polymer composition of the invention is very useful for application in electronics and electro-technical applications.

Normally the particle size distribution of the antimony trioxide is normal and small. Hence the average of the particle size distribution (APS) is representative and normally used and reported in the specification of the antimony trioxide. However where the particle size distribution is not normal, for example when the distribution is very broad, skewed or bimodal for example due to the use of a mixture of batches having different particle size distributions, the average is not representative anymore and the main claim relates to a polymer composition comprising at least 0.1 wt. % antimony trioxide with a particle size of at least 0.5 micrometer, more specifically, the polymer composition comprises between 0.1 and 10 wt. %, more preferably between 0.5 and 8 wt. % and most preferably between 1 and 5 wt. % antimony trioxide with a particle size of at least 0.5, preferably at least 1 , more preferably at least 2 and most preferably at least 3 micrometer.

The polymer composition may contain halogen containing flame retardant and antimony trioxide having the specified particle size according to the invention. In this embodiment the antimony trioxide works both as a synergist for the halogen flame retardant and as laser marking additive. In this case the amount of antimony trioxide is, in view of obtaining good flame retardant properties, preferably above 5 wt. %. More preferably however, the polymer composition is essentially halogen free and the amount is chosen only in view of laser marking properties as described above, preferably between 0.5 and 5 wt. %.

Preferably, the polymer composition, in particular when the antimony trioxide content is above 2 or 3 wt. %, also contains a CTI improver, such as for instance barium sulphate, for reduction of the electrical conductivity. It has been found that their unique combination of properties make such compositions particularly suitable for use in electrical equipment.

In a particularly preferred embodiment of the polymer composition according to the invention the composition also contains a nacreous pigment as a synergist for antimony trioxide for laser marking.

It was found that a polymer composition containing a polymer, at least 0.5 wt. % antimony trioxide and at least 0.1 wt. % of a nacreous pigment as a synergistic laser marking additive has a better contrast than a composition with comparable total amount of antimony trioxide. It was also found that surprisingly low amounts, for example up to only 1 or 2 wt. % of the rather expensive nacreous pigment, gives a very significant improvement of the contrast with the antimony trioxide. The advantage is that a lower total amount of laser marking additive is required for good contrast resulting in lower costs and better mechanical and electrical properties. The preferred average particle size and the amounts of the antimony trioxide as described above apply also in the combination with the nacreous pigment.

Nacreous pigment consists of plate-shaped particles with a high refractive index of e.g. a silicate preferably covered with metal oxide. A definition of nacreous pigment is given for instance in the "Encyclopaedia of Chemical Technology Kirk-Othmer", third edition (1982), Vol. 17, p. 833. Examples of nacreous pigments that can be used in the polymer composition according to the invention are described in EP-B-0797511, paragraph 0016, 0017 and 0018.

The amount of nacreous pigment present in the polymer composition according to the invention preferably is at least 0.1 wt. %, more preferably at least 0.3 wt. %, and even more preferably at least 0.4 wt. % and most preferably at least 0.6 wt. %. The advantage of this is an increasing improvement of the contrast. Preferably, however, the amount of nacreous pigment is lower than 5 wt. %, preferably lower than 3 wt. % and more preferably lower than 2 wt. % as this results in better mechanical and electrical properties of the polymer composition while the contrast obtained upon laser marking is not substantially less. Preferably, therefore, the polymer composition contains between 0.1 and 5 and more preferably between 0.3 and 3 and most preferably between 0.5 and 2 wt. % nacreous pigment. The weight ratio of the nacreous pigment and the antimony trioxide in the polymer composition according to the invention may be chosen within wide limits but in the light of the improvement of the contrast of the marking this ratio preferably lies between 1:0.5 and 1:20, more preferably between 1:1 and 1:10 and even more preferably between 1:2 and 1:5. Due to the synergistic nacreous pigment the amount of antimony trioxide may remain relatively low. In a preferred embodiment of the polymer composition according to the invention the composition contains between 0.5 and 3 wt. % antimony trioxide and between 0.1 and 3 wt. % nacreous pigment. More preferably the composition contains between 1 and 3 wt. % antimony trioxide and between 0.1 and 2 wt. % nacreous pigment The total amount of antimony trioxide and nacreous pigment is preferably below 6 wt. %, more preferably below 5 wt. % and most preferably below 4 wt. %.

The polymer in the polymer composition may be any polymer or mixture of polymers. For instance, thermoplastics, thermosets, resins as well as elastomers are suitable. Where the polymer composition is a thermoset or a resin composition, the invention also refers to a precursor polymer composition, which is a polymer composition according to the invention having, instead of the polymer, the monomer or oligomer precursors of said polymer. Preferably, the polymer composition according to the invention contains polyamide or polyester, for instance polybutylene terephthalate. These polymers are highly suitable for laser marking and are widely used in applications in which laser markability is desired, such as in electronic components.

The polymer composition according to the invention can also contain one or more of the customary additives, such as for instance fillers, plasticizers, flame-retardants, pigments and lubricants.

In a preferred embodiment the polymer composition according to the invention contains a halogen-free flame retardant. The advantage of this polymer composition is the special combination of good laser writability and flame retardancy without using environmentally unfriendly halogen-containing compounds. Preferably, the halogen-free flame retardant is melamine cyanurate.

The polymer composition according to the invention can be prepared in any customary manner, for instance by separately adding the antimony trioxide and optionally the nacreous pigment and mixing them with the polymer during extrusion of the polymer. Another process comprises the preparation of a so-called masterbatch composition in which the nacreous pigment and the antimony trioxide have been mixed in the desired ratios, optionally in a polymer matrix, following which the masterbatch is added and mixed with the polymer of the polymer composition.

The invention also relates to articles made wholly of partly of the polymer composition according to the invention. All known techniques for the preparation of the articles from the polymer composition can be used, like for example injection molding, blow molding, casting, extrusion etc. In another embodiment the article may comprise a substrate having a coating thereon of the polymer composition according to the invention. Such article may be formed by applying a pre-polymer composition on the substrate and then in-situ polymerizing to form the polymer composition. The invention also relates to articles, for example key caps, electric or electronic components, comprising the polymer composition according to the invention having a laser marking thereon having a contrast value of at least 1.5, preferably at least 2, more preferably at least 2.5, most preferably at least 3.

The invention also relates to a process for applying a dark marking to a light background by radiating an article consisting, at least at the place where the marking is applied, of a polymer composition according to the invention by means of laser light in the pattern of the marking. Preferably this is done by means of an Nd:YAG laser. The advantage of this laser is that it is stable and has a writing head. In a specially preferred embodiment of the process a diode-pumped laser is used. This has the advantage that this laser is much less expensive and more available and, in spite of a lower pulse length and beam diameter, still produces markings sufficiently rich in contrast when applied to the polymer composition according to the invention.

EXAMPLES I–VII AND COMPARATIVE EXPERIMENTS A–B

A number of polymer compositions were prepared using an extruder (type ZSK 30, screw length 34 D, from Werner & Pfleiderer, Germany). The extruder was equipped with three dosing units, all located on the extruder throat. Via the first dosing unit the following materials were dosed: Nylon 6 (Akulon K122 from DSM, the Netherlands), 27 wt. % of a masterbatch containing 40 wt. % melamine cyanurate (a halogen-free flame retardant from DSM, the Netherlands) and 60 wt. % Nylon 6 (Akulon K122 from DSM), 1 wt. % $TiO_2$ (type RF-K-D from Bayer, Germany), and, in varying amounts, antimony trioxide ($Sb_2O_3$ AO/PA-80/20: containing 80% $Sb_2O_3$ and 20% polyamide, from Campine B.V., Belgium), mixed and coated with nacreous pigment (Iriodine® LS820, from Merck, Belgium) or an ordinary mica not forming part of the nacre family (Mica SFG20 from Aspanger, Austria). The antimony trioxide has an average particle size (APS) of 0.8 micrometers as indicated by the producer Campine B.V. (Fisher number, measured according the permeability method). The weight percentages of the latter components are presented in Table 1.

20 wt. % glass (CS173X-10C, 4 mm) was dosed via the second unit. The other ingredients were fed via a so-called master fluff. The master fluff contained a pigment composition of such a composition that the color of the platelets made of the polymer composition could be defined as RAL7035 (a light-grey color). Besides the pigments the fluff contained 0.1 wt. % Irganox® 1098 (from CIBA, Switzerland) and 0.2 wt. % calcium stearate and 15 wt. % Nylon-6 powder. The weight percentages relate to the total weight of the polymer composition.

The temperatures in the extruder zones were set as follows: zone 1: 200° C., zone 2: 230° C. and zones 3 up to and including 9: 260° C. Degassing took place in the $8^{th}$ zone. During compounding nitrogen was supplied both to the dosing units and to the extruder throat. The speed was 200 revolutions per minute.

The amounts of mica Iriodine® LS820 or Mica SFG20 and antimony trioxide ($Sb_2O_3$ AO/PA-80/20) used for the various compositions are presented in Table 1.

TABLE 1

| Composition | I | II | III | IV | V | VI | VII | A | B |
|---|---|---|---|---|---|---|---|---|---|
| Mica LS 820 | 1 | 1 | 1 | 0.8 | 0.6 | — | — | 0.8 | — |
| ($Sb_2O_3$ AO/PA-80/20 | 3.5 | 2.5 | 1.5 | 3.5 | 3.5 | 3.5 | 1.5 | — | — |
| Mica SFG20 | — | — | — | — | — | 1 | 1 | — | — |

The various compositions were molded into platelets and provided with a marking. Use was made of a lamp-pumped Nd:YAG laser from Haas, Germany (wavelength=1064 mm, 10 W monomode) and from a diode pumped laser from Haas, Germany (wavelength=1064 mm, 10–15 W monomode). Both lasers were operated in the maximum contrast conditions set as follows. The lamp-pumped Nd:YAG laser power was 90% of the maximum power at a pulse frequency of 3000 Hz. The beam diameter of the laser beam was about 85 :m (in focus). The markings had a resolution of 300 dpi, both in the X and in the Y direction. The diode pumped laser power was 99% of the maximum power at a pulse frequency of 20000 Hz. The beam diameter of the laser beam was about 50 :m (in focus). The markings had a resolution of 508 dpi, both in the X and in the Y direction.

Markings were formed in the various platelets of which the color varied from very light gray (hardly visible) to dark gray brown (well visible). The contrast of the darker markings relative to the lighter background was quantified using a Minolta CM-3700d color spectrometer (Specular Component Included) with the following characteristics: reflection d/8 (diffuse lighting/8° viewing angle); wavelength range: 360–740 nm; pulsed xenon arc lamp.

Measurements were made over a wavelength range of 400–700 nm. The reflection values were based on $D_{65}$. The contrast values were obtained by dividing the reflection value measured for the background by the reflection value measured for the marking color. Measurements were made on markings of 3×3 cm. The results of the contrast calculations are presented in Table 2 for the lamp pumped and diode pumped laser marked samples respectively.

TABLE 2

| Composition | Contrast value (lamp/diode) |
|---|---|
| I | 2.1 |
| II | 2.1/2.3 |
| III | 2.0/2.3 |
| IV | 2.2/2.4 |
| V | 2.3/2.4 |
| VI | 1.4/1.2 |
| VII | 1.1/1.1 |
| A | 1.6/1.7 |
| B | 1.1/1.0 |

It is evident from Table 2 that polymer compositions that contain both nacreous pigment and antimony trioxide result, after processing into a molded article and marking with the aid of a laser, in markings with a good contrast. Surprisingly good results were obtained with the diode pumped laser marked samples. The contrast of markings on molded articles made of other compositions is significantly less. Examples VI and VII show the situation of a low particle size in combination with a low concentration resulting in rather poor contrast. The following examples show that also without nacreous pigments as synergist very good contrast can be obtained at higher concentrations and/or particle sizes.

EXAMPLES VIII–XIII AND COMPARATIVE EXPERIMENT C

Polymer compositions of Examples VIII–XIII and Comparative Experiment C were prepared as described above with the exception that 20 wt. % glass (737BC 1/64 milled fibers) was used. Further, in examples X to XIII no pigments were added, due to which a natural color was obtained. Further, Comparative Experiment C and Examples VIII–XIII differ in the particle size of the antimony trioxide as indicated in Table 3. All samples contain 4 wt. % antimony trioxide. No further laser marking additives were added. The polymer compositions were molded to test platelets and provided with a marking using the diode pumped laser and tested to determine the contrast value and CTI (comparative tracking index as measured according to ASTM).

TABLE 3

| Composition | APS | Contrast value |
|---|---|---|
| C | 0.4 | 1.0 |
| VIII | 0.5 | 1.6 |
| IX | 1.2 | 1.7 |
| X (natural) | 0.5 | 1.5 |
| XI (natural) | 1.2 | 1.7 |
| XII (natural) | 3 | 3.9 |
| XIII (natural) | 12 | 4.2 |

What is claimed is:

1. A laser markable polymer composition of light color comprising:
   a) a polymer
   b) from 0.1 to 10 wt %, relative to the total weight of the polymer composition, of antimony oxide particles having an average particle size above 0.5 micrometer; and
   c) a nacreous pigment.

2. Polymer composition according to claim 1, characterized in that the antimony trioxide has a particle size between 1 and 8 micrometer.

3. Polymer composition according to claim 2, characterized in that the amount is between 0.5 and 5 wt %.

4. Polymer composition according to claim 1, wherein the polymer composition is free of halogen-flame retardant.

5. Polymer composition according to claim 1, comprising between 2 and 5 wt. % antimony trioxide with an average particle size of at least 1.5 micrometers.

6. Polymer composition according to claim 1 containing from 0.1 to 5 wt % antimony trioxide and at least 0.1 wt. % of a nacreous pigment.

7. Polymer composition according to claim 1, containing between 0.5 and 3 wt. % antimon trioxide and between 0.1 and 3 wt. % nacreous pigment.

8. Polymer composition according to claim 1, wherein the weight ratio of the nacreous pigment and the antimony trioxide lies between 1:5.5 and 1:50.

9. Polymer composition according to claim 1, wherein the polymer composition contains a halogen-free flame retardant.

10. Polymer composition according to claim 9, characterized in that it contains melamine cyanurate as the halogen-free flame retardant.

11. Article, wholly or partly made of the polymer composition according to claim 1.

12. Process for applying a dark laser marking onto a light background, in which an article consisting, at least at the place where the marking is applied, of a polymer composition containing a polymer and at least 0.1 wt. %, relative to the total weight of the polymer composition, of antimony trioxide having an average particle size above 0.5 micrometer, is irradiated with laser light in the pattern of the marking.

13. Polymer composition according to claim 1 containing from 0.5 to 10 wt % antimony trioxide and at least 0.1 wt. % of a nacreous pigment.

14. The composition of claim 1 wherein when exposed to laser light the composition forms a mark with a contrast value of at least 1.5.

15. A light colored laser markable polymer composition comprising:
   a) polymer
   b) from 0.1 to 10 wt %, relative to the total weight of the polymer composition, of antimony trioxide particles with an average particle size above 0.5 micrometer; and
   c) at least 0.3 wt % of a nacreous pigment,
   wherein when exposed to laser light the composition forms a mark with a contrast value of at least 1.5.

16. Polymer composition of claim 15 wherein the antimony trioxide particles have particle size between 1 and 8 micrometers.

17. Polymer composition according to claim 15, wherein the polymer composition is free of halogen-flame retardant.

18. Polymer composition according to claim 15 containing from 0.1 to 5 wt % antimony trioxide and at least 0.4 wt. % of a nacreous pigment.

* * * * *